United States Patent [19]

Waggoner

[11] Patent Number: 4,524,841
[45] Date of Patent: Jun. 25, 1985

[54] AUXILIARY AXLE APPARATUS

[76] Inventor: Wayne Waggoner, P.O. Box 31357, Billings, Mont. 59107

[21] Appl. No.: 553,522

[22] Filed: Nov. 21, 1983

[51] Int. Cl.³ .................... B62D 61/10; B62D 61/12
[52] U.S. Cl. ................................ 280/81 A; 280/118; 280/134; 280/442
[58] Field of Search .......... 280/423 A, 405 A, 476 R, 280/426, 442, 81 A, 81 R, 117, 118, 133, 134, 676; 180/209, 24.02

[56] References Cited

U.S. PATENT DOCUMENTS

| | | | |
|---|---|---|---|
| 1,150,727 | 8/1915 | Alexander | 280/117 X |
| 3,257,124 | 6/1966 | Mendez | 180/24.02 X |
| 4,025,084 | 5/1977 | Mendez | 280/81 A |

FOREIGN PATENT DOCUMENTS

| | | | |
|---|---|---|---|
| 1078037 | 11/1954 | France | 280/81 A |
| 1543207 | 5/1967 | France | 280/81 A |
| 502225 | 11/1954 | Italy | 280/81 A |

Primary Examiner—John A. Pekar
Attorney, Agent, or Firm—Arthur L. Urban

[57] ABSTRACT

Auxiliary trailer axle apparatus including a frame portion, a carriage portion, a hitch portion, a bearing portion, a support portion and a lifting portion; the frame portion including a substantially horizontal section, supporting members extending downwardly from the horizontal section adjacent the ends thereof, the supporting members being pivotally connected to the horizontal section; the carriage portion including an axle housing section secured between the supporting members adjacent the lower ends thereof, an axle member carried by the axle housing section, wheels disposed on the ends of the axle member, expandable members disposed between the horizontal section and the axle housing section; the hitch portion including a tongue section extending from the frame portion substantially perpendicular to the axle section, connecting mechanism disposed on a free end of the tongue section; the bearing portion including at least one pair of low friction pad members, one of the pad members being disposed adjacent each end of a top surface of the frame portion; the support portion including an upper support member disposed above the frame portion and closely adjacent thereto, the upper support member including a bottom surface in contact with the pad members of the bearing portion, mechanism for affixing the support portion to a frame section of a trailer; the lifting portion including mechanism connected to the axle housing section for raising the wheels off the ground.

17 Claims, 4 Drawing Figures

AUXILIARY AXLE APPARATUS

This invention relates to a novel axle apparatus and more particularly relates to a new auxiliary axle apparatus.

Years ago most cargo hauling was handled by railroads. More recently, trucks have taken over a larger and larger proportion of the freight hauling until today trucks haul most freight. Originally, the trucks were relatively small with a flat bed or closed body mounted on the same chassis as the driver's cab. Presently, most freight is hauled in large rigs that include a tractor and one or more trailers. Such combinations can carry much more cargo than earlier trucks and so reduce the hauling cost per pound.

As the trucking industry developed and over the road hauling increased, various rules, regulations and legislation have been passed to control the operation of cargo carrying vehicles. Such rules have been in a number of different areas. Some have been controls on weight and size. Also, certain safety equipment is required. Inspections must be performed at intervals. In addition, a driver may be limited as to the maximum hours or miles that can be driven in a given period of time. These regulations have significantly increased the costs of hauling.

While owners of trucking lines have to comply with the rules and regulations, they still have to figure out how to operate at a profit so they can stay in business. Thus, there have been many attempts at modifying or redesigning equipment in order to lower the cost of hauling cargo. To reduce the possibility of damage to fragile cargo, new suspension systems have been developed. Similarly, new engines, accessories and the like have been proposed to increase fuel economy.

However, one of the problems with trying to develop new equipment is the widely varying conditions under which the vehicles are operated. While a rig ordinarily is fully loaded much of the time, the rig may have to be operated when empty or lightly loaded in some situations. Since the difference in weight between partial and full loads is very large, the operation of the equipment is completely different under the two conditions.

With a light load, the power, suspension and braking requirements are at a low level as compared with the requirements when operating under a full load. However, the same engine, suspension and brakes are present on a rig at all times and they must successfully cope with both situations.

Generally, the designs represent compromises between the respective preferred specifications for full loads and light loads. Such compromises may provide a satisfactory level of performance over only a narrow range of conditions and less than desirable performance over a larger proportion of the conditions under which the equipment is operated.

Although some of the compromises may only adversely affect the costs of operation, other compromises may create safety hazards. For example, a compromise suspension may limit the type of cargo that can be handled or it may increase damage. A compromise on brakes can result in an accident if a heavy load cannot be stopped in the required distance.

From the above discussion, it is clear that past and present designs for trucks and other vehicle hauling rigs do not provide the desired high level of performance under a significant proportion of the situations encountered in normal operating conditions. Thus, there is a need for new equipment and devices that can overcome the deficiencies and shortcomings of previous designs.

The present invention provides a novel apparatus to improve the performance of cargo trailers. The apparatus of the invention provides a novel auxiliary axle apparatus that improves the handling of a rig both when fully loaded and also when operated empty. Corners can be taken more easily without heavy horsepower demands and tire scuffing. Also, vehicle and load stability is improved. In addition, traction and braking are better both at full and light loads.

The auxiliary axle apparatus of the present invention is simple in design and can be produced relatively inexpensively. The apparatus can be manufactured from commercially available materials and components. Conventional trailer and axle assembly production techniques and procedures and semi-skilled labor can be employed in its manufacture.

The apparatus can be installed on a trailer in a short period of time by a mechanic using standard tools and skills. The apparatus can be removed from a trailer and/or transferred to a different trailer quickly and conveniently to change the combinations of axles for special loads or passage through particular states or governmental jurisdictions.

Trailers including the auxiliary apparatus of the present invention can be used efficiently after only a minimum of instruction to the drivers. The improved handling characteristics of trailers including the apparatus permit less experienced drivers to operate the rigs more safely and efficiently.

The axle apparatus is durable in construction and has a long useful life. A minimum of maintenance is required to keep the apparatus in working condition.

These and other benefits and advantages of the novel auxiliary axle apparatus of the present invention will be apparent from the above description and the accompanying drawings in which.

Figure 1:
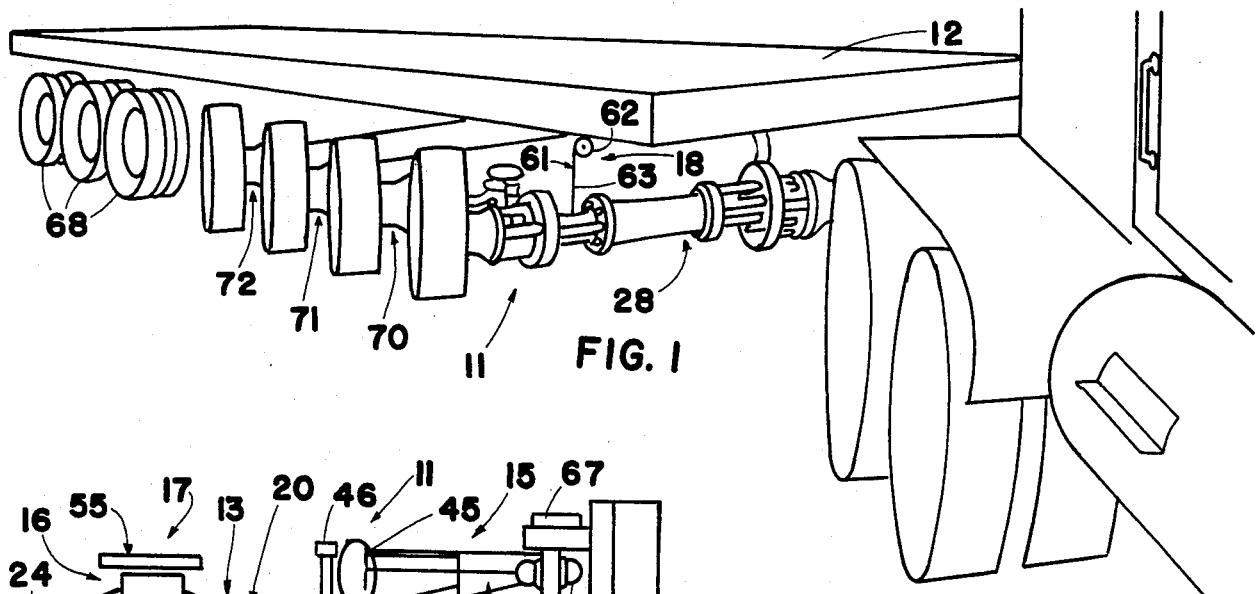
FIG. 1 is a view in perspective of one form of the auxiliary trailer axle apparatus of the invention mounted on a cargo trailer.
Figure 2:
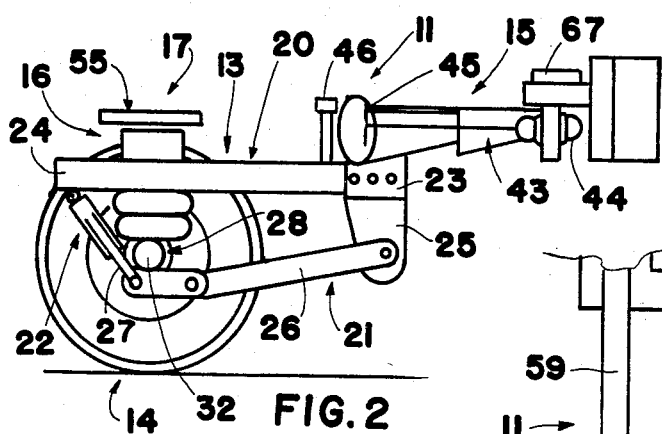
FIG. 2 is an enlarged left end view of the auxiliary trailer axle apparatus shown in FIG. 1 with a wheel removed.
Figure 3:
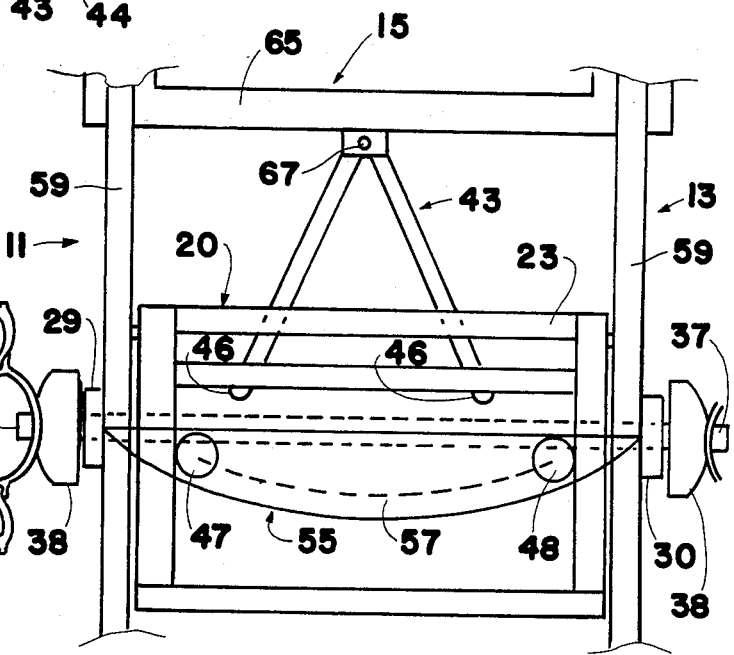
FIG. 3 is a top view partially in section of the auxiliary trailer axle apparatus shown in FIGS. 1 and 2.
Figure 4:
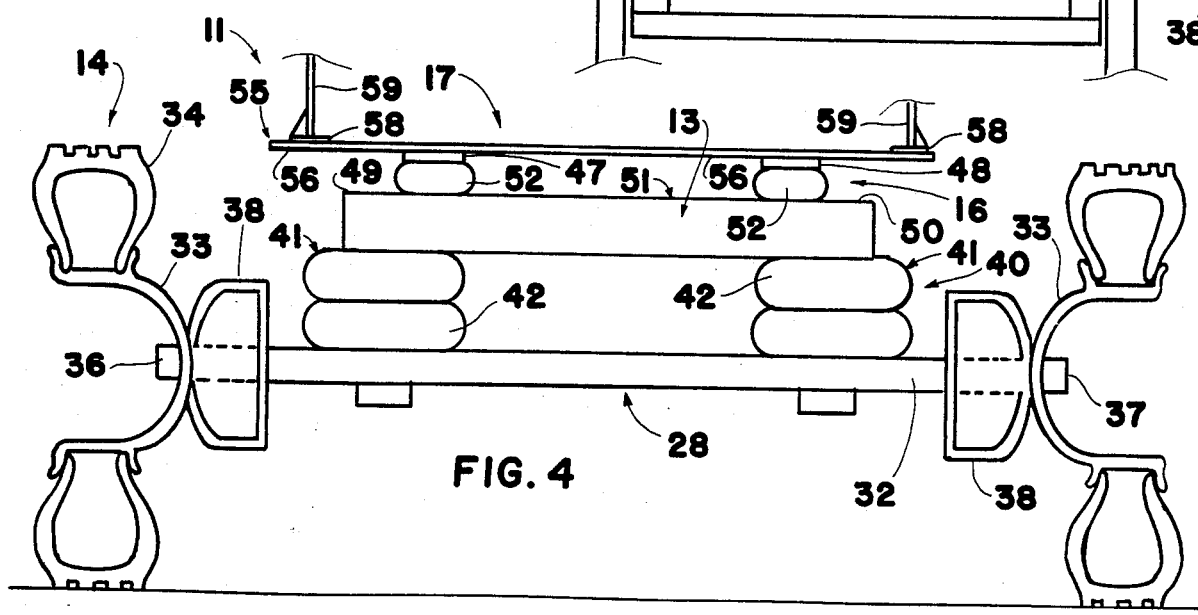
FIG. 4 is an enlarged back view of the auxiliary trailer axle apparatus of the invention.

As shown in the drawings, one form of the novel auxiliary trailer axle apparatus 11 of the present invention is mounted on a flat bed trailer 12. The trailer also may be an enclosed van or another type of trailer. The auxiliary trailer axle apparatus 11 includes a frame portion 13, a carriage portion 14, a hitch portion 15, a bearing portion 16, a support portion 17 and a lifting portion 18.

The frame portion 13 of the axle apparatus 11 of the invention includes a substantially horizontal section 20. Advantageously, the horizontal section 20 has a generally box channel configuration.

Supporting members 21 and 22 extend downwardly from the horizontal section 20 adjacent the ends 23 and 24 thereof. The supporting members 21 and 22 are pivotally connected to the horizontal section directly or through suitable brackets 25. The supporting sections preferably include radius rod sections 26 that are pivotable on generally horizontal shafts. Also, shock absorbers 27 extend downwardly toward the free ends of the radius rod sections.

The carriage portion 14 of the axle apparatus 11 includes an axle housing section 28. The axle housing section 28 is secured between the supporting sections 21 and 22 adjacent the lower ends 29 and 30 thereof. The axle housing section advantageously is disposed substantially parallel to the horizontal section 20.

An axle member 32 is carried by the axle housing section 28. Wheels 33 and tires 34 are disposed on the ends 36 and 37 of the axle member. Brakes 38 also are included for the wheels.

Expandable members 40 are disposed between the horizontal section 20 and the axle housing section 28. The expandable members advantageously include inflatable sections 41. Preferably, the inflatable sections include expandable bag or bladder members 42.

Hitch portion 15 of the axle apparatus 11 of the invention includes a tongue section 43 that extends from the frame portion 13. The tongue section 43 extends in a direction substantially perpendicular to the axle member 32. Advantageously, the tongue section 43 is aligned with the longitudinal center line of the axle apparatus. Connecting means such as latch 44 is located on the free end of the tongue section. The latch 44 may be activated with an air actuatable tightener 45. The hitch portion preferably includes stop sections 46 to control movement of the apparatus.

The bearing portion 16 of the axle apparatus 11 includes at least one pair of pad members 47 and 48. One of the pad members 47 or 48 extends upwardly adjacent each end 49 and 50 respectively of a top surface 51 of the frame portion 13. The bearing portion 16 advantageously includes resilient sections 52 that are located between the pad members and the frame portion. The pad members have an exposed surface with low frictional characteristics such as a plastic material and preferably a nylon pad.

The support portion 17 of the apparatus 11 includes an upper support member 55. The upper support member is disposed above the frame portion 13 and closely adjacent thereto. The support member 55 is separated from the frame portion by the bearing portion 16. The bearing portion 16 while being affixed to the frame portion is slidable with respect to the bottom surface of the support member 55.

The upper support member 55 includes a bottom surface 56 in contact with the pad members 47 and 48 of the bearing portion. The bottom surface 56 of the upper support member advantageously includes a continuous surface and preferably an arcuate surface 57. The support portion 17 also includes means such as welds 58 for affixing the support member 55 to frame members 59 of a trailer 12.

The lifting portion 18 of the apparatus 11 includes means 61 connected to the axle housing section 28 for raising the axle member 32 and the wheels 33 carried thereby to separate the wheels from the ground. Advantageously, the lifting portion 18 includes combinations of pulleys 62 and cables 63 with suitable manual or power drive means (not shown).

In the use of the auxiliary axle apparatus 11 of the present invention as shown in the drawings, a suitable hitch support cross member 65 is mounted between longitudinal frame members 59 of a trailer 12. Also, a support member 55 is affixed to the underside of the frame members 59 at a sufficient spacing to be located above the bearing portion 16 of the apparatus.

Thereafter, the trailer is raised and the apparatus 11 is slid into position under the trailer. Latch 44 of the hitch portion 15 is aligned with the hitch support cross member 65 and secured thereto with a pin 67 and tightener 46. The pad members 47 and 48 are positioned under the arcuate support surface 57 of support member 55.

Trailer 12 is lowered so its rear wheels 68 are back in contact with the ground. Air bag members 42 are inflated so part of the load bears on the apparatus. In the same way, additional axle apparatus units 70, 71 and 72 may be installed. The trailer 12 and the auxiliary axle apparatus now are ready for use.

A driver operates the rig in the normal manner. However, when the rig is driven around a corner, the auxiliary axle apparatus 11 which is secured to the trailer only through hitch portion 15 pivots about the hitch connection, and the apparatus shifts to the outside of the turn as shown in FIG. 1. Similarly, the other auxiliary axle units 70, 71 and 72 also shift outwardly of the turn. When the turn is completed and the trailer is moving in a straight line again, the auxiliary axle units move back to their normal positions under the trailer.

As the auxiliary axle apparatus 11 pivots about the hitch connection and the apparatus moves to the outside of a curve, pad members 47 and 48 slide along the support member surface 57 to one side or the other while still bearing weight of the trailer. With the pad members formed of a low friction material, this movement of the pad members with respect to the support surface 57 is accomplished with a minimum of resistance.

The pivoting of the auxiliary axle apparatus 70–72 is achieved in the same way. This shifting of the apparatus and the resulting pivoting of the wheels thereof with respect to the trailer frame provides a high degree of self steering which significantly reduces tire scuffing over the highway surface. Thus, there is less tire and highway wear and horsepower requirements are reduced.

On banked curves, the trailer follows a curve easily and loads do not lean outwardly. Stability of the rig is greatly improved and load shifting is minimized. With the load evenly distributed, braking power is substantially improved.

The presence of the auxiliary axle apparatus units allows greater total loads to be carried satisfactorily with the load being distributed over more axles so the weight per axle remains within specified limits. The greater number of axles reduces trailer bounce as the trailer moves over the highway. This is particularly advantageous with flat bed trailers that normally experience fatigue from the flexing which ordinarily occurs as such a trailer bounces over the road.

The auxiliary axle apparatus of the invention also can provide improved traction by adjusting the air pressure within the bag members 42 to concentrate the weight of the load on the pulling axles and thus keep the tires from slipping. This reduces tire and highway wear and substantially eliminates wheel spinning.

After a load has been removed from the trailer, one or more of the auxiliary axle apparatus 11, 70, 71 and 72 can be lifted from the road surface by activating lifting portion 18. This can be accomplished by deflating the air bag members 42, activating cables 63 manually or by suitable drive means (not shown).

With the trailer being supported only on a minimum number of axles, the empty trailer rides more smoothly and braking is maintained at a high level. Also, the high degree of wear and tear that normally occurs when an empty trailer is towed over the road is significantly reduced with the apparatus of the invention in an inactive position.

The above description and the accompanying drawings show that the present invention provides a novel auxiliary axle apparatus that can be operated more safely and efficiently than previous tractor/trailer combinations. The apparatus of the invention when mounted on a trailer provides superior cornering ability and braking and greater rig and load stability. In addition, larger payloads can be hauled with less highway wear and less wear on the trailer structure. Furthermore, these benefits and advantages can be achieved with less horsepower and better fuel economy so the hauling cost per unit weight is significantly reduced.

The utilization of the auxiliary axle apparatus of the invention on trailers provides an extra margin of safety for less experienced drivers. Trailers can be adapted to provide a high level of performance for the many different conditions encountered in cargo hauling. Such modifications can be done by the driver from the cab automatically if desired without assistance from other individuals.

The auxiliary axle apparatus can be produced relatively inexpensively from commercially available materials and components using conventional axle fabricating techniques. The apparatus can be installed and removed from trailers easily in a short period of time. The apparatus is durable in construction and requires little maintenance.

It will be apparent that various modifications can be made in the particular auxiliary axle apparatus described in detail above and shown in the drawings within the scope of the invention. The size, configuration and arrangement of components can be changed to meet specific requirements. The apparatus can be used as single units or as combinations. The hitch connection can be different if desired. These and other changes can be made in the axle apparatus provided the functioning and operation thereof are not adversely affected. Therefore, the scope of the invention is to be limited only by the following claims.

What is claimed is:

1. Auxiliary trailer axle apparatus including a frame portion, a carriage portion, a hitch portion, a bearing portion, a support portion and a lifting portion; said frame portion including a substantially horizontal section, supporting members extending downwardly from said horizontal section adjacent the ends thereof, said supporting members being pivotally connected to said horizontal section; said carriage portion including an axle housing section secured between said supporting members adjacent the lower ends thereof, an axle member carried by said axle housing section, wheels disposed on the ends of said axle member, expandable members disposed between said horizontal section and said axle housing section; said hitch portion including a tongue section extending from said frame portion substantially perpendicular to said axle section, connecting means disposed on a free end of said tongue section; said bearing portion including at least one pair of low friction pad members, one of said pad members being disposed adjacent each end of a top surface of said frame portion; said support portion including an upper support member disposed above said frame portion and closely adjacent thereto, said upper support member including a bottom surface in contact with said pad members of said bearing portion, means for affixing said support portion to a frame section of a trailer; said lifting portion including means connected to said axle housing section for raising said wheels off the ground.

2. Auxiliary axle apparatus according to claim 1 wherein said horizontal section has a generally box channel configuration.

3. Auxiliary axle apparatus according to claim 1 wherein said supporting members of said frame portion include radius rod sections.

4. Auxiliary axle apparatus according to claim 1 wherein said supporting members of said frame sections include shock absorbers.

5. Auxiliary axle apparatus according to claim 1 wherein said supporting members are pivotable on generally horizontal shafts.

6. Auxiliary axle apparatus according to claim 1 wherein said axle housing section is disposed substantially parallel to said horizontal section.

7. Auxiliary axle apparatus according to claim 1 wherein said expandable members include inflatable sections.

8. Auxiliary axle apparatus according to claim 7 wherein said inflatable sections include expandable bag members.

9. Auxiliary axle apparatus according to claim 1 wherein said tongue section is aligned with a longitudinal center line of said apparatus.

10. Auxiliary axle apparatus according to claim 1 wherein said bearing portion includes resilient sections between said low friction pad members and said frame portion.

11. Auxiliary axle apparatus according to claim 1 wherein said pad members are formed of nylon.

12. Auxiliary axle apparatus according to claim 1 wherein said bottom surface of said upper support member includes a continuous surface.

13. Auxiliary axle apparatus according to claim 12 wherein said upper support member includes an arcuate surface.

14. Auxiliary axle apparatus according to claim 1 wherein said lifting portion includes pulley and cable means.

15. Auxiliary axle apparatus according to claim 1 including a plurality of auxiliary axle apparatus disposed close to one another.

16. Auxiliary axle apparatus according to claim 1 wherein said auxiliary axle apparatus is located intermediate the length of a trailer.

17. Auxiliary axle apparatus according to claim 1 wherein the movement of said apparatus is limited by stop sections selectively engageable with a frame of said trailer.

* * * * *